(12) United States Patent
Lisitsyn et al.

(10) Patent No.: US 7,529,627 B2
(45) Date of Patent: May 5, 2009

(54) METHOD OF SEA ELECTRICAL SURVEY OF OIL AND GAS DEPOSITS AND APPARATUS COMPLEX FOR ITS REALIZATION 'VESOTEM'

(75) Inventors: Evgenij Dmitrievich Lisitsyn, St. Petersburg (RU); Andrej Vladimirovich Tulupov, Moscow (RU); Alexandr Arkadevich Petrov, St. Petersburg (RU); Vladimir Eduardovich Kyasper, St. Petersburg (RU)

(73) Assignee: "EMMET" JSC, Moscow (RU)

( * ) Notice: Subject to any disclaimer, the term of this patent is extended or adjusted under 35 U.S.C. 154(b) by 0 days.

(21) Appl. No.: 11/795,051

(22) PCT Filed: May 26, 2006

(86) PCT No.: PCT/EA2006/000006

§ 371 (c)(1),
(2), (4) Date: Jul. 10, 2007

(87) PCT Pub. No.: WO2007/003203

PCT Pub. Date: Jan. 11, 2007

(65) Prior Publication Data

US 2008/0189042 A1    Aug. 7, 2008

(30) Foreign Application Priority Data

Jun. 16, 2005    (RU) .............................. 2005118534

(51) Int. Cl.
*G01V 1/40* (2006.01)
*G01V 3/18* (2006.01)
*G01N 15/08* (2006.01)

(52) U.S. Cl. .............................. 702/13; 702/66; 702/81; 324/334; 324/365; 324/339; 250/301; 250/253

(58) Field of Classification Search .................... 702/13, 702/57, 66, 81; 324/332, 334, 337–339, 324/365; 340/500; 73/152.01
See application file for complete search history.

(56) References Cited

U.S. PATENT DOCUMENTS

| | | | | |
|---|---|---|---|---|
| 4,008,469 | A * | 2/1977 | Chapman | 342/22 |
| 6,456,197 | B1 * | 9/2002 | Lauritsen et al. | 340/539.26 |
| 7,126,338 | B2 * | 10/2006 | MacGregor et al. | 324/334 |

FOREIGN PATENT DOCUMENTS

| | | |
|---|---|---|
| GB | 2390904 | 1/2004 |
| RU | 2236028 | 9/2004 |
| RU | 2253881 | 6/2005 |
| RU | 48645 | 10/2005 |
| SU | 98229 | 3/1954 |
| SU | 150184 | 9/1962 |
| SU | 909646 | 2/1982 |

OTHER PUBLICATIONS

Wismann, 'Radar Signatures of Mineral Oil Spills Measured by An Airborne Multi-Frequency Radar adn the ERS-1 SAR', 1995, University of Hamburg, Germany, pp. 940-942.*

* cited by examiner

Primary Examiner—Edward Raymond
Assistant Examiner—Elias Desta
(74) Attorney, Agent, or Firm—Aleksandr Smushkovich

(57) ABSTRACT

A method for electrical survey of hydrocarbons deposits under seabed depths up to 1500 m and equipment therefor are provided. The equipment includes a vessel, a generator, an excitation field block, connected with a vertical dipole with coax electrodes, a data registration/processing block, bottom systems with. The lower dipole electrode is situated at maximally 100 m from the seabed, the upper electrode at maximally 200 m from the surface. The operation of the generator and bottom systems is synchronized the dipole is submersed into the sea, and fed with alternating-sign rectangular current pulses, whose on-off time ratio and duration are programmably determined. The bottom systems register reflected signals and electromagnetic field components, when the dipole's current is on and off. Analysis of the signals accounts modifications of primary and secondary fields, transient field changes for determination of the environment resistivity and strata polarization characteristics thereby improving the hydrocarbons deposits prognosis.

8 Claims, 5 Drawing Sheets

METHOD OF SEA ELECTRICAL SURVEY OF OIL AND GAS DEPOSITS AND APPARATUS COMPLEX FOR ITS REALIZATION 'VESOTEM'

CROSS-REFERENCE TO RELATED APPLICATIONS

This application is a U.S. national phase application of a PCT application PCT/EA2006000006 filed on 26 May 2006, whose disclosure is incorporated herein in its entirety by reference, which PCT application claims priority of a Russian Federation patent application RU2005118534 filed on 16 Jun. 2005.

FIELD OF THE INVENTION

The present invention is related to the field of exploration geophysics, in particular to the geo-electrical survey and it is intended for prediction of oil-and-gas presence based on the seabed sounding in case of depths up to 1500 m.

BACKGROUND OF THE INVENTION

Nowadays different methods of the sea exploring for location of hydrocarbons deposits are widely used. These methods are application-dependent and include excitation electromagnetic field pulses acting upon the seabed, subsequent registration of the changes in the near-bottom strata electromagnetic parameters, and analysis of the obtained data for detection of existing anomalies and determination of their nature. Such exploring is realized using different research complexes of apparatus and equipment (RC), as, for instance, taught in RU 2236028, 2004; SU 1122998, 1984; SU 1798666, 1996; SU 1434385, 1988; U.S. Pat. No. 4,298,840, 1981; U.S. Pat. No. 4,617,518, 1986.

There is a well-known method of sea electrical survey on a drifting ice-floe provided by means of a research complex consisting of exciting and receiving arrays, a source of alternating-sign periodical current pulses and a data processing system (RU2069375, 1993). The essence of this method is that exciting and receiving arrays are placed upright under ice in the water layer. The pulses feeding are provided by the source of alternating-sign periodical current pulses of several dozens amperes by means of ERS 72 or another system, the data processing is provided by means of a digital electrical survey system of a TSESS type. The section profiling is realized with a fixed distance between the points of signals excitation and receiving after, wherein the excitation is provided by alternating-sign pulses. Only vertical component of the electric field is measured in this case. However, this method can't be used in measurement during a vessel movement, as it is based on excitation a water layer that is immovable in relation_to the ice-floe. Moreover, this method may not be employed in the case of depth more than 200 m.

For the vessels survey, the methods involving the analysis of data on the strata polarization under the action of electromagnetic field (the method of induced polarization, the TEM method etc.) are more universal and promising (RU 2236028, 2004; SU 1122998, 1984; SU 1798666, 1996; SU 1434385, 1988; U.S. Pat. No. 4,298,840, 1981;U.S. Pat. No. 4,617,518, 1986).

So, during the carrying out the survey according to the method of induced polarization (RU 2094829, 1993), one registers the density of the electromagnetic field of the induced polarization, representing the difference between the strength of the complete field and the strength of the field caused by the process of the induced polarization. According to the results of analysis of this parameter changes depending on time, one may judge about presence of geo-electric irregularities and their nature.

A typical RC used for the sea electrical survey includes a vessel-carrier of apparatus, provided with an echo-sounder, towed horizontal dipole with the source electrodes and receiving electrodes. The complete set of the apparatus located on the vessel includes pulse formation units for registration and analysis of the obtained data and auxiliaries, ensuring that the vessel is sited to the point of research, providing a fixation of the sea depth etc. (RU 1819354, 1990).

The disadvantage of this method and the RC used therefor is its practical unsuitability for the shelf research with the sea depth more than 150-200 m wherein the polarizing influence on the seabed strata is not measurable.

The most similar to the present invention by the technical essence and achieved effect is the complex of sea electrical survey and a RC used therefor, with a conditional name CSEM (L. MacGregor, M. Sinha/Geophysical Prospecting, 2000, 48, 1091-1106; GB 2402745, 2003), that allows to carry out the survey at depths up to 3 km.

The essence of that method (L. MacGregor, M. Sinha/ Geophysical Prospecting, 2000, 48, 1091-1106) is that the electromagnetic pulses are transmitted from the horizontal dipole, submerged into water at a depth close to the sea depth at this place, and the reflected pulses are received by bottom systems previously placed on the sea bottom. The obtained data is compared with analogous data obtained in a similar region, where hydrocarbons deposits are absent, and on the base of such comparison one can draw a conclusion on the availability of hydrocarbons deposits in the region.

For obtaining the indicated data the horizontal dipole with the moment about $10^4$ Am is towed in a region of the bottom system at a distance about 50 m from the seabed. The dipole radiates a continuous pulse signal of electromagnetic field with a frequency 0,25-4 Hz. Since the electrical resistivity of the seawater is lower that the resistivity of the seabed, such signal is quickly damped in the water, and as a result in the process of measurement at the distance more than 500 m from the radiation source the bottom system receives only signals referred to the resistivity of the seabed strata. As a result, the receivers of the bottom systems register two orthogonal components of the horizontal electric field at the distance up to 15 km from the source. Examination of the changes in amplitude and phase of the obtained signal permits to obtain information on the electric resistivity of the strata at depths up to 5-7 km.

The RC used therefor (described in GB 2402745, 2003) comprises a vessel, upon which a generator is mounted, the outboard apparatus (OA) containing a unit of rectangular pulses formation and connected with the generator by means of a connecting cable to feed the OA, a horizontal electric dipole with the length of about 100 m with the dipole moment of about $10^4$ Am and bottom systems of different types.

Disadvantages of the CSEM technology are the possibility of obtaining limited information volume on the seabed strata, in particular, impossibility during the use of this technology to obtain the data on the strata chargeability, essentially and this reduces the prognosis accuracy.

SUMMARY OF THE INVENTION

The task of the authors was to develop a method of sea electrical survey and an RC for its realization, enabling the survey at significant depths to obtain data on the strata chargeability, in order to increase the hydrocarbons prognosis accuracy.

The indicated task was solved with the use of a technology conventionally named "VeSoTEM", based on a theoretical fact ascertained by the authors, that at predetermined conditions using a vertical dipole for exciting of electromagnetic field pulses instead of a horizontal dipole, one may achieve measurable polarization of the seabed strata, and as a result obtain additional information on its nature.

The technical result of the inventive method is achieved due to the following before the submersion of the dipole, one synchronizes clocks installed on a generator device mounted on a vessel and on bottom systems, the dipole is disposed substantially vertically so that its upper end is situated at a distance no more than 200 meters from the sea surface, and the lower end no more than at a distance of 100 m from the seabed (optimally 20-30 m from the seabed), the electromagnetic field excitation is produced by an excitation field formation unit providing alternating-sign electrical current pulses of substantially rectangular form with the duration and the on-off time ratio controlled by a preprogrammed computer; with the help of the bottom systems one registers a time series of signals, registering components of the electromagnetic field, both at the moments of the current transmission and in its absence, and in the signals analysis one takes into account the modification of not only primary, but also secondary electromagnetic fields within the time, and, in particular, characteristics of the signals decay, and one determines not only the environment resistivity, but also its polarization characteristics.

The RC, serving for carrying out the aforesaid method, comprises a vessel carrying an excitation field formation unit, connected with a dipole including source electrodes submerged into the water; registration devices; and auxiliary equipment. The technical result regarding the inventive device is obtained due to the fact that instead of a horizontal source dipole, a vertical one is deployed. The dipole's lower end is disposed at a distance no more than 100 m from the seabed.

The RC includes a winch, mounted on the vessel, which winch is used for maintaining a substantially constant distance from the dipole's lower electrode to the sea-bottom and guaranteeing in that way invariance of parameters of the outgoing signal.

In preferred embodiments, the dipole includes coaxial conductors used for feeding of the dipole's electrodes, which conductors include a fragment made from a coaxial cable for connecting the generator and the upper generating electrode of the dipole.

The deployment of the vertical source dipole instead of the horizontal one in connection with the sea-bottom stations equipped with horizontal electrodes allows obtaining the polarization of the seabed strata, which may be measured during registration of horizontal and vertical components of the reflected electromagnetic field signals. The application of the coaxial cable for the generator line allows preventing magnetization of the winch during changing the dipole position for maintaining a constant distance from the lower electrode to the sea-bottom and guaranteeing in that way invariance of parameters of the outgoing signal.

The excitation field formation unit includes a vessel generator, a commutator, a current-collecting device, a ballast device, ensuring power dissipation of the generator in the intervals between pulses and presenting the couples of electric dipoles with different directions and equal moments, a block of data registration and processing (FIG. 1, block 9), and a current measuring device. The commutator is connected: with the ballast device; via the current-collecting device with the dipole; and via the current measuring device with the block of data registration and processing.

The RC includes auxiliaries, in particular, a recovering system block of the bottom systems, an apparatus for determination of the vessel location, the sea depth, etc.

The RC includes a set of sea-bottom systems providing measurement of horizontal and vertical components of EM field is used for registration of reflected signals.

The bottom systems are designed based on typical electrical or electromagnetic bottom stations, allowing to carry out registration of the electromagnetic field components with a predetermined accuracy. The bottom systems are so situated that no fewer than three systems are located in the area of a possible deposit, and a number of the systems are located beyond its boundaries. The use of several bottom systems allows to differentiate the responses from different depths, and based on mathematical modeling one may identify anomalies of the electrical resistivity and parameters of IP and in aggregate with the data of other geophysical methods (e.g., prospecting seismology) to make a conclusion on the presence of hydrocarbons in the survey section.

Figure 1:
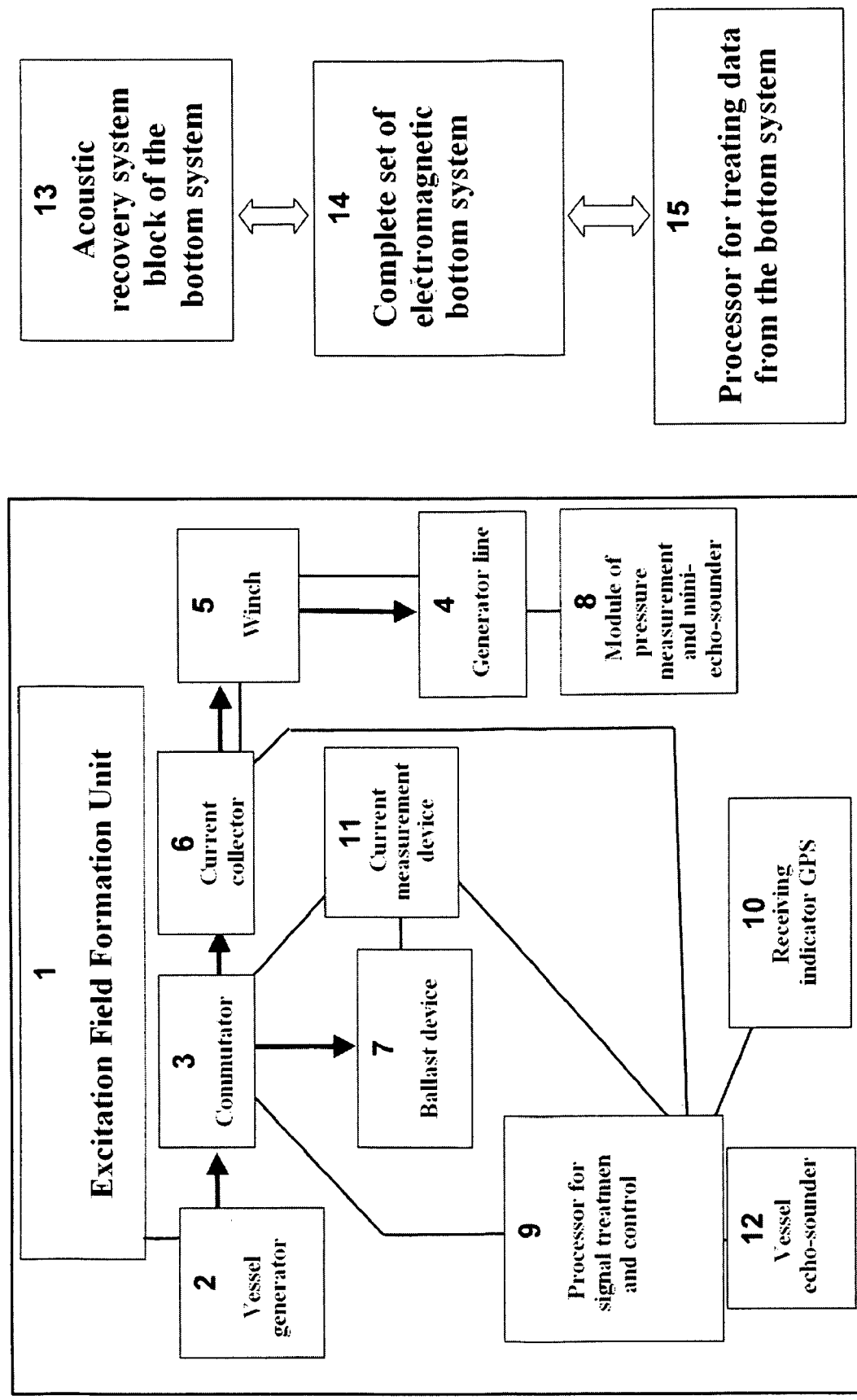
FIG. 1 is the scheme of an excitation field formation unit according to an embodiment of the present invention.
Figure 2:
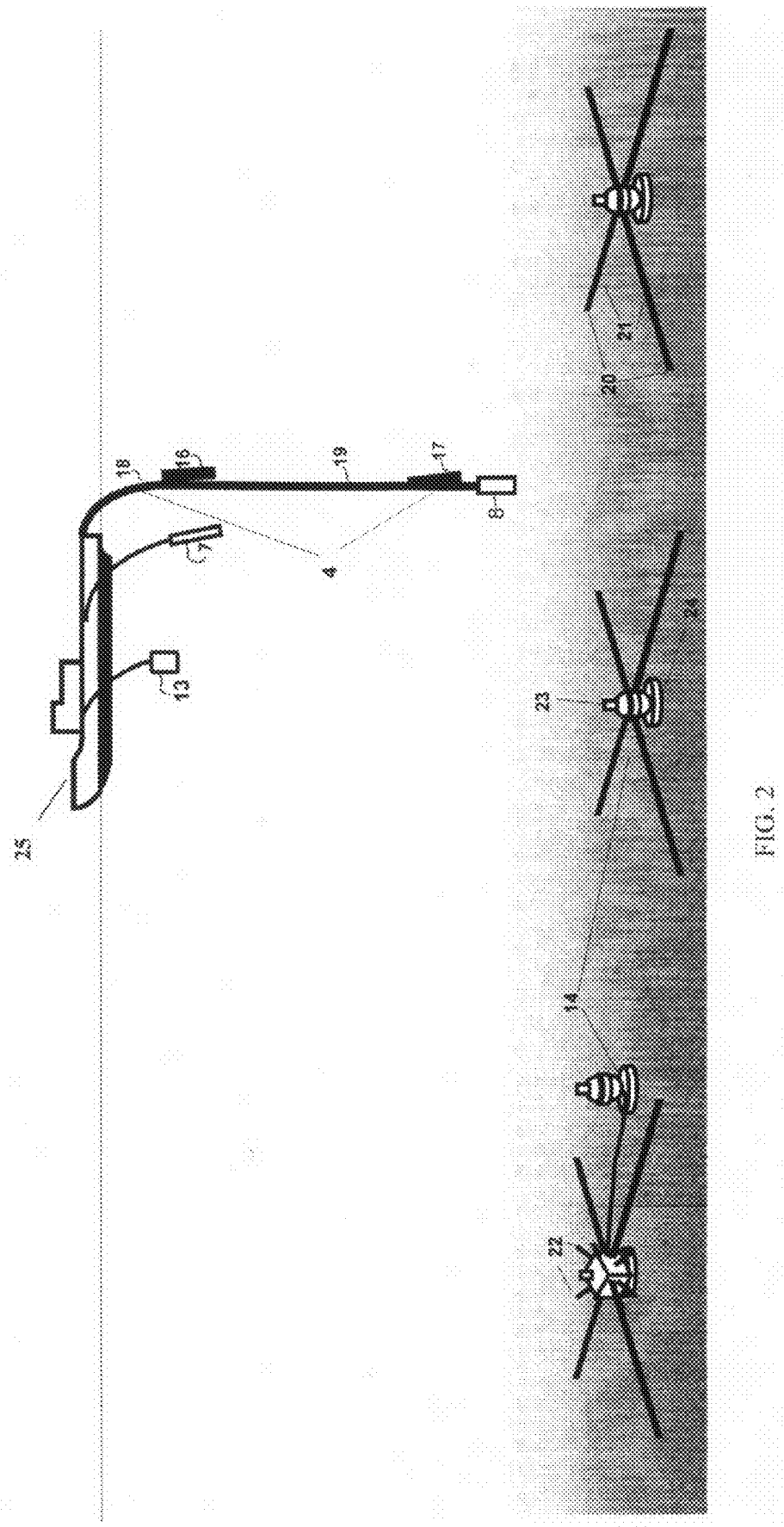
FIG. 2 is a typical scheme of the RC according to an embodiment of the present invention.

The following designations are used in the drawings (FIGS. 1, 2): an Excitation Field Formation Unit 1 (EFFU) comprising a Vessel Generator 2 carried by a Vessel 25, a Commutator 3, a Generator Line 4, a Winch 5, a Current Collector 6, a Ballast Device 7, a Module of Pressure Measurement and Mini-Echo-Sounder 8 capable to indicate a distance from the seabed, a Processor for Signals Processing and Control 9, a Receiving Indicator GPS 10, a Current Measurement Device 11, and a Vessel Echo-Sounder 12.

The RC additionally includes (as shown on FIG. 1) an Acoustic Recovering System Block of Bottom Systems 13, a Complete Set of Bottom Electromagnetic Systems 14, and a Processor for Treating Data from Bottom Systems 15.

The Generator Line 4 (as shown on FIG. 2) comprises an Upper Part 18 with two coax power conductors: external and internal (not illustrated), an Upper Electrode 16 connected to the external conductor, a Generator Dipole 19 with a Lower Source Electrode 17 connected to the internal conductor.

The bottom systems 14 are provided with Receiving Electrodes 20, mounted at the ends of Remote Arms 21, Inductive Receivers of Magnetic Field 22, Acoustic Releases 23, and Loads 24 for keeping the bottom systems 14 on the seabed during operation of the RC.

An "OM" abbreviation in the graphs (FIGS. 3, 4, 5) means a distance measured in meters from the bottom systems to the dipole.

DESCRIPTION AND OPERATION OF THE PREFERRED EMBODIMENT

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

The RC depicted in the drawings (FIGS. 1, 2) comprises a vessel 25 with the EFFU 1, including: the generator 2, the commutator 3, the current collector 6, the generator line 4, the ballast device 11, the pressure measurement module and the echo-sounder 8, as well as the complete set of the bottom systems 14. The generator line 4 is submerged into the water by means of the winch 5 so that the lower source electrode 17 is located at the distance of 10-30 m, but no more than 100 m from the seabed.

The research complex "VeSoTEM" operates in the following way. When the vessel 25 travels to the point of the profile beginning and before deploying the bottom systems one executes the synchronization of the clocks respectively of the processor for signals processing and control 9 and of the bottom systems 14 according to reference signals (e.g., a signal PPS of the GPS system). The bottom systems 14 are located along the measurement profile in the prescribed points (illustrated on FIG. 2) so that no fewer than three systems are situated at the area of the possible deposit, and a part of systems is situated beyond its boundaries.

After deployment of the systems 14, the vessel 25 travels to a point situated at a distance no less that the sea depth from the profile beginning, the generator line 4 is lowered upright, so that the lower source electrode 17 is positioned at the distance no more than 100 m from the seabed, that is controlled via indication of the mini-echo-sounder of the module 8. Then the EFFU 1 is started. It forms bidirectional pulses with pauses, which have a polarizing influence on the seabed strata. The pulses and pauses duration is defined from 0.5 up to 16 sec depending on the existing tasks and peculiarities of the used apparatus.

During the pauses, one connects to the vessel generator 2 the non-radiating ballast device 7 that reduces the load swings. The current measurement device 11 executes the measurement of current in the dipole 19 with a discreteness established by a preprogrammed computer, both during the pulse and in the pause between pulses with fixation of the time from the beginning to the end of each pulse.

During the excitation field forming process, the vessel is positioned at a given point according to the GPS signals during at least 10 minutes. At the same time, the bottom systems 14 provide the signal registration with the same discreteness that in the EFFU 1, both during the pulse and in the pause between pulses.

Then the vessel 25 travels to the next prescribed point, where the process is repeated. After passing the whole profile the EFFU 1 is switched off, the generator line 4 is winched on the board, and a command is issued to the recovery system block of the bottom systems 13 for a subsequent emersion of the bottom systems 14. After the bottom systems recovering, one makes a measurement of the difference value at the clocks of the bottom systems and the generator line 4. The obtained difference is evenly attributed to the measurement period.

The signals from the bottom systems 14 measured at the current pulses moments and pauses are memorized in the bottom systems data treatment processor 15 for further processing and interpreting.

For the evaluation of enablement of this method, a mathematical modeling was carried out. The sea depth is 1000 m, the length of the horizontal electrical dipole (HED) towed at the distance of 50 m from the seabed is 500 m, and the length of the vertical electrical dipole (VED) is 1000 m. The environment model emulating the sea hydrocarbons deposit used for theoretical calculations consists of 5 layers. The parameters of each layer of the model were determined according to the formula Cole-Cole:

$$\rho_j^\omega = \rho_j^0 (1 - \eta_j) \Big/ \left(1 - \eta_j \frac{1}{1 + (-i\omega\tau_j)^{c_j}}\right),$$

where $\rho^\omega$ the resistivity at the frequency $\omega$, $\eta$—the chargeability, $\tau$—the time constant, and c—the exponential quantity, j—the layer number. The layers parameters are listed in the TABLE below.

TABLE

| | Parameters | | | | |
|---|---|---|---|---|---|
| Layer number | $\rho$, $\Omega$m | $\eta$, % | $\tau$, sec | C | h (thickness, m) |
| 1 | 0.3 | 0 | — | — | 1000 |
| 2 | 1 | 0.5 | 0.1 | 0.5 | 100 |
| 3 | 1 | 5 | 1 | 0.5 | 1900 |
| 4 | 50 | 0 | — | — | 100 |
| 5 | 1 | 0.5 | 0.1 | 0.5 | 100 |

Figure 3:
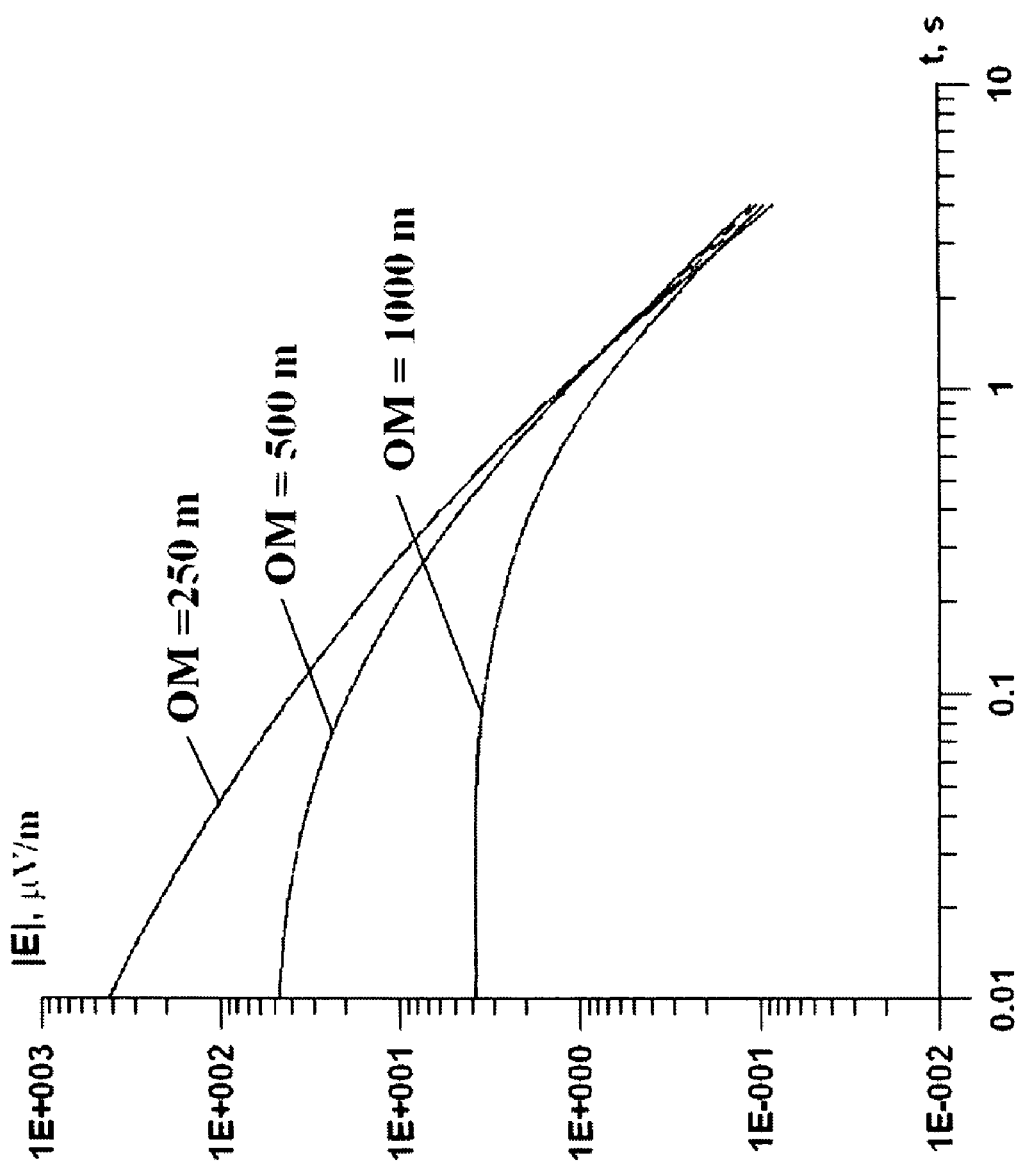
FIG. 3 is a graph, representing results of calculation of electric fields registered by the bottom system during the environment excitation by the HED (the solid lines represent a model with a deposit and the modified strata, the dotted line represents background).
Figure 4:
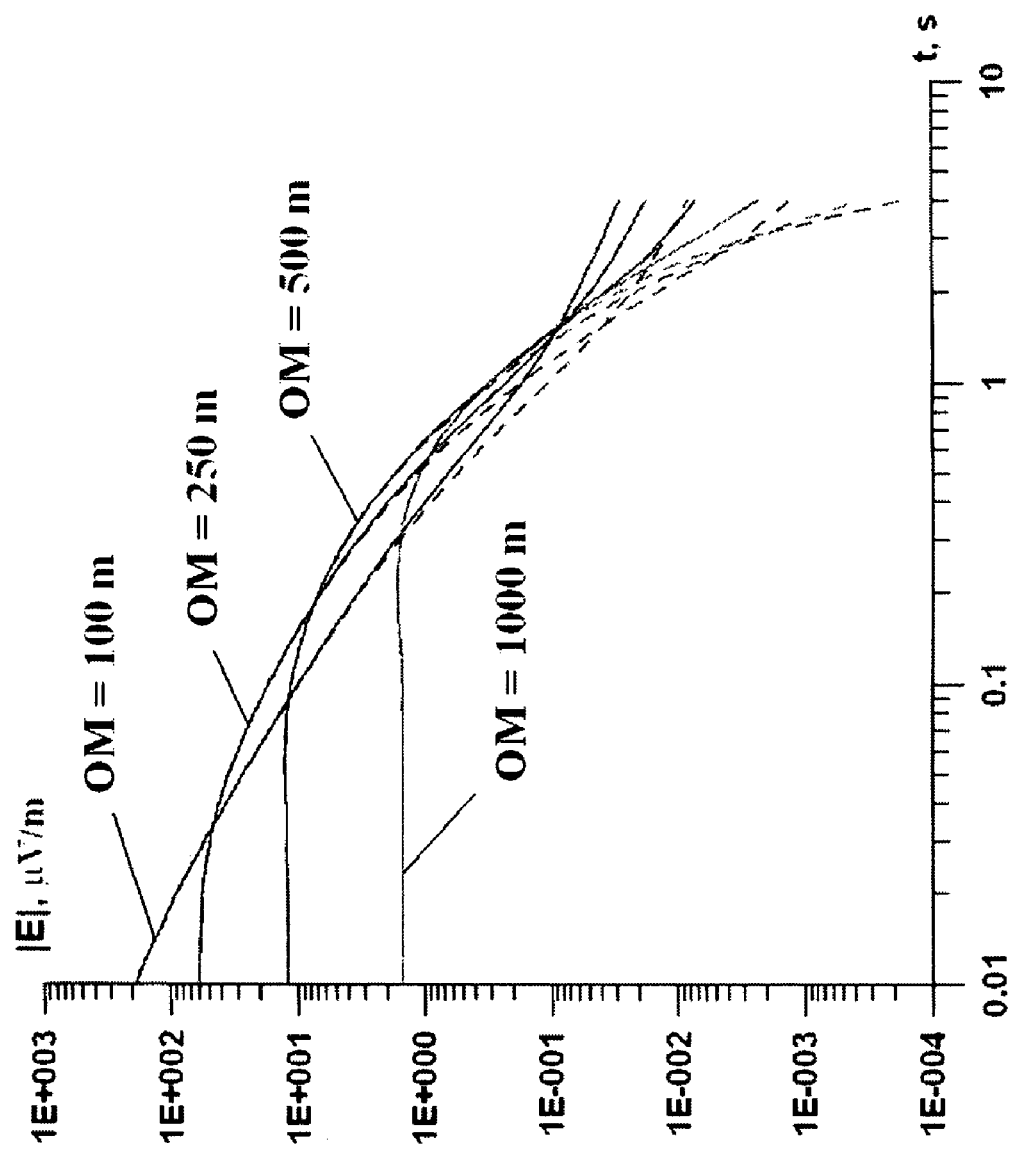
FIG. 4 is a graph, representing results of calculation of electric fields registered by the bottom system during the environment excitation by the VED (the solid lines represent a model with a deposit and the modified strata, the dotted line represents background).

At the FIGS. 3 and 4 there are the results of calculation of the electric fields, registered by the bottom systems during the environment excitation by the HED and VED (the solid lines represent the model with deposit and the modified strata, the dotted line represents the background).

From the given data one can see that with the use of the HED at this sea depth the fields difference in cases of hydrocarbons presence and in their absence is practically absent, while the use of the VED the difference at the late stage of the transient process (t>0.5 s) is very significant and may be registered by means of the bottom systems.

Figure 5:
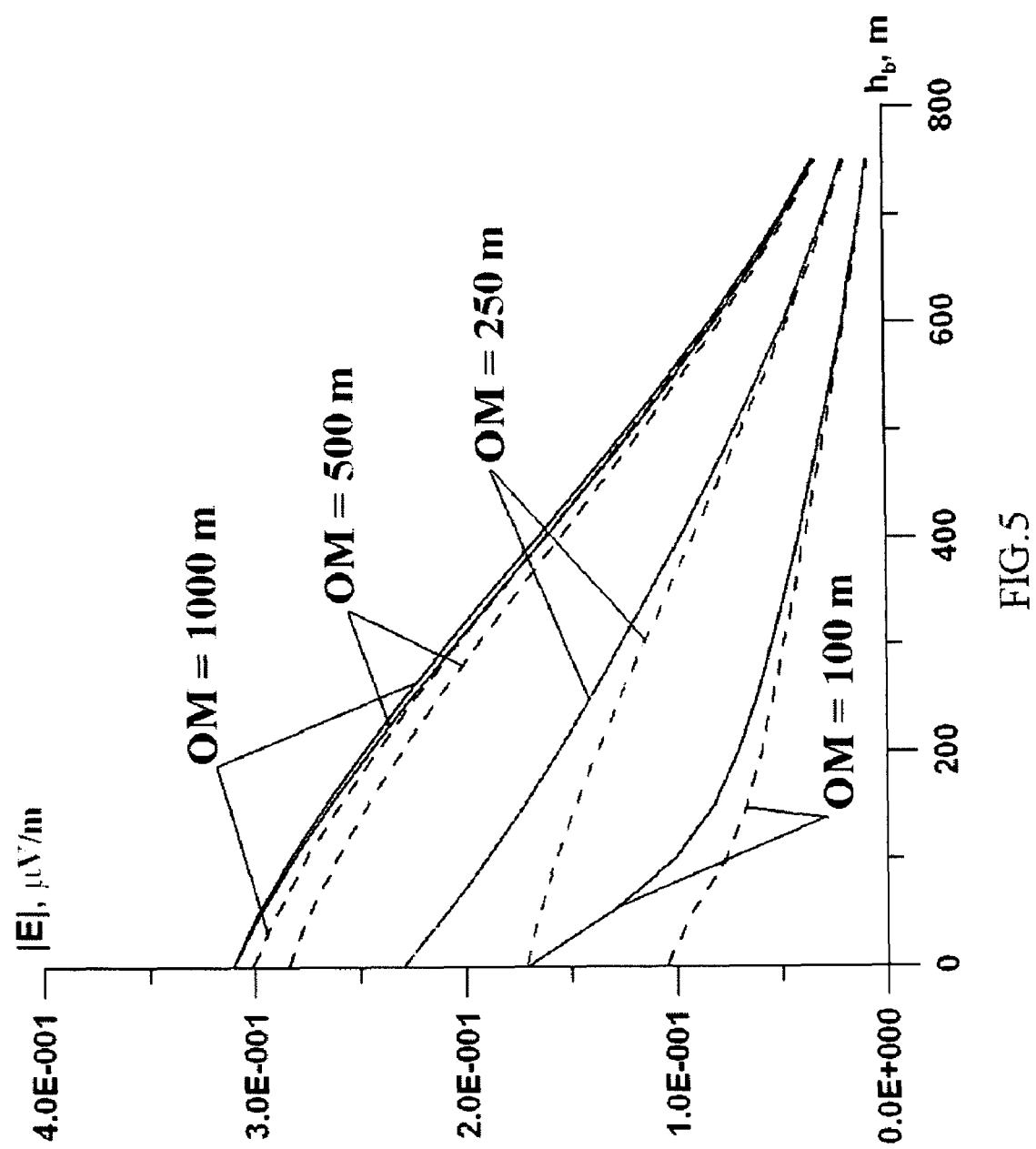
FIG. 5 is a graph, representing the signals changing in the case where the lower dipole electrode moves upwards from the seabed.

The FIG. 5 illustrates the signal modification in the case where the lower dipole electrode moves away from the seabed (t=1 s). It's evident from the given drawing, that when the lower electrode moves away from the seabed the signals change very significantly and therefore it ought to be kept at the distance no more than 100 m.

INDUSTRIAL APPLICATION

The above-mentioned results have shown the possibility of obtaining the strata polarization characterstics with the use of the inventive complex and its enablement for the hydrocarbons deposits survey in the deep-water regions with the purpose of carrying out more qualitative prognosis of their presence under the seabed in the region of search.

The use of the disclosed technology combined with other geophysical methods data allows to increase reliability of determination of the hydrocarbons presence in the deep-water conditions, and thereby to raise efficiency of the exploration drilling.

We claim:

1. A method for sea electrical survey of hydrocarbons deposits under seabed in a survey zone, comprising the steps of:
   arranging a plurality of bottom systems on the seabed in the survey zone, said bottom systems register electromagnetic signals reflected from the seabed and measure their characteristics;
   providing electromagnetic field excitation means, said excitation means generate a fixed in time series of alternating-sign electromagnetic pulses of rectangular form with a duration and an on-off time ratio controlled by a preprogrammed computer;
   synchronizing the operation of said excitation means and said bottom systems;
   providing a dipole connected to the excitation means and vertically positioned in the survey zone, said dipole having an upper end situated at no more than 200 meters from the sea surface and a lower end situated at no more than 100 m from the seabed, said dipole, being in the vertical position;
   excitation of the series of said alternating-sign electromagnetic pulses through the dipole during a predetermined time;
   repeatedly moving said dipole horizontally within the survey zone from a first point to a second point situated at a distance equal at least the sea depth in the first point, thereafter the second point considered as a new first point;
   operatively registering changes of predetermined electromagnetic field parameters during the predetermined time by said bottom systems;
   measuring the predetermined electromagnetic field parameters for both the excitation field and the reflected field by said bottom systems both during the generation of said electromagnetic pulses and in absence thereof;
   determining the environment resistivity and strata polarization characteristics of the seabed based on said measuring of the predetermined electromagnetic field parameters; and
   compiling a prognosis on presence or absence of the hydrocarbons deposits in the survey zone based at least on anomalies of said resistivity and strata polarization characteristics.

2. The method according to claim 1, wherein
   the determining of the environment resistivity being calculated based on the Cole-Cole formula as follows:

$$\rho_j^\omega = \rho_j^0 (1-\eta_j) \Big/ \left(1 - \eta_j \frac{1}{1+(-i\omega\tau_j)c_j}\right),$$

wherein $\rho^\omega$ represents the resistivity at the frequency $\omega$, $\eta$ represents the chargeability, $\tau$ represents the time constant, c represents the exponential quantity, and j represents the layer number.

3. A research complex for sea electrical survey of hydrocarbons deposits under seabed in a survey zone, comprising:
   a sea vessel;
   a generator installed on the vessel;
   an excitation field formation unit installed on the vessel and connected with the generator, said excitation field formation unit generates a fixed in time series of alternating-sign electromagnetic pulses of rectangular form with a duration and an on-off time ratio controlled by a preprogrammed computer;
   a dipole associated with the vessel, said dipole substantially connected with the excitation field formation block, said dipole including a lower source electrode and an upper source electrode for submerging into seawater, said dipole irradiates an excitation electromagnetic field acting upon the seabed;
   a plurality of bottom systems each including registering devices that register horizontal and vertical components of the excitation electromagnetic field and of a reflected electromagnetic field reflected from the seabed with predetermined accuracy, said bottom systems fixed to the seabed; and
   data processing means for registration and processing of data obtained from said excitation field formation unit and said registering devices;
   wherein the research complex characterized in that
   said dipole being positioned vertically, so that the lower electrode situated at a distance not exceeding 100 m from the seabed and the upper electrode situated at a distance not exceeding 200 meters from the sea surface.

4. The research complex according to claim 3, wherein
   the upper dipole electrode connected substantially to the excitation field formation unit by a cable used to feed the dipole; said cable including at least a fragment made from a coaxial cable.

5. The research complex according to claim 3, wherein
   the plurality of said bottom systems so arranged that at least three systems being located within the survey zone, and a predetermined number of the systems are located beyond the survey zone.

6. The research complex according to claim 3, wherein
   said dipole associated with the vessel by means of a winch controlled to maintain the lower electrode situated at a distance not exceeding 100 m from the seabed and the upper electrode situated at a distance not exceeding 200 meters from the sea surface.

7. The research complex according to claim 3, wherein
   said excitation field formation unit comprising a commutator, a collector of current, a ballast arrangement, and a current measurement device.

8. The research complex according to claim 7, wherein
   said commutator connected with the ballast arrangement, said commutator connected with said dipole via the collector of current, said commutator connected with the data processing means via the current measurement device.

* * * * *